3,518,025
HELICOPTER ROTOR SYSTEM
Jacob Schmidt, Van Nuys, Lee Baumstein, Woodland Hills, and Arthur M. James, Granada Hills, Calif., assignors to Lockheed Aircraft Corporation, Burbank, Calif.
Filed May 6, 1968, Ser. No. 726,982
Int. Cl. B64c 27/48
U.S. Cl. 416—131                         4 Claims

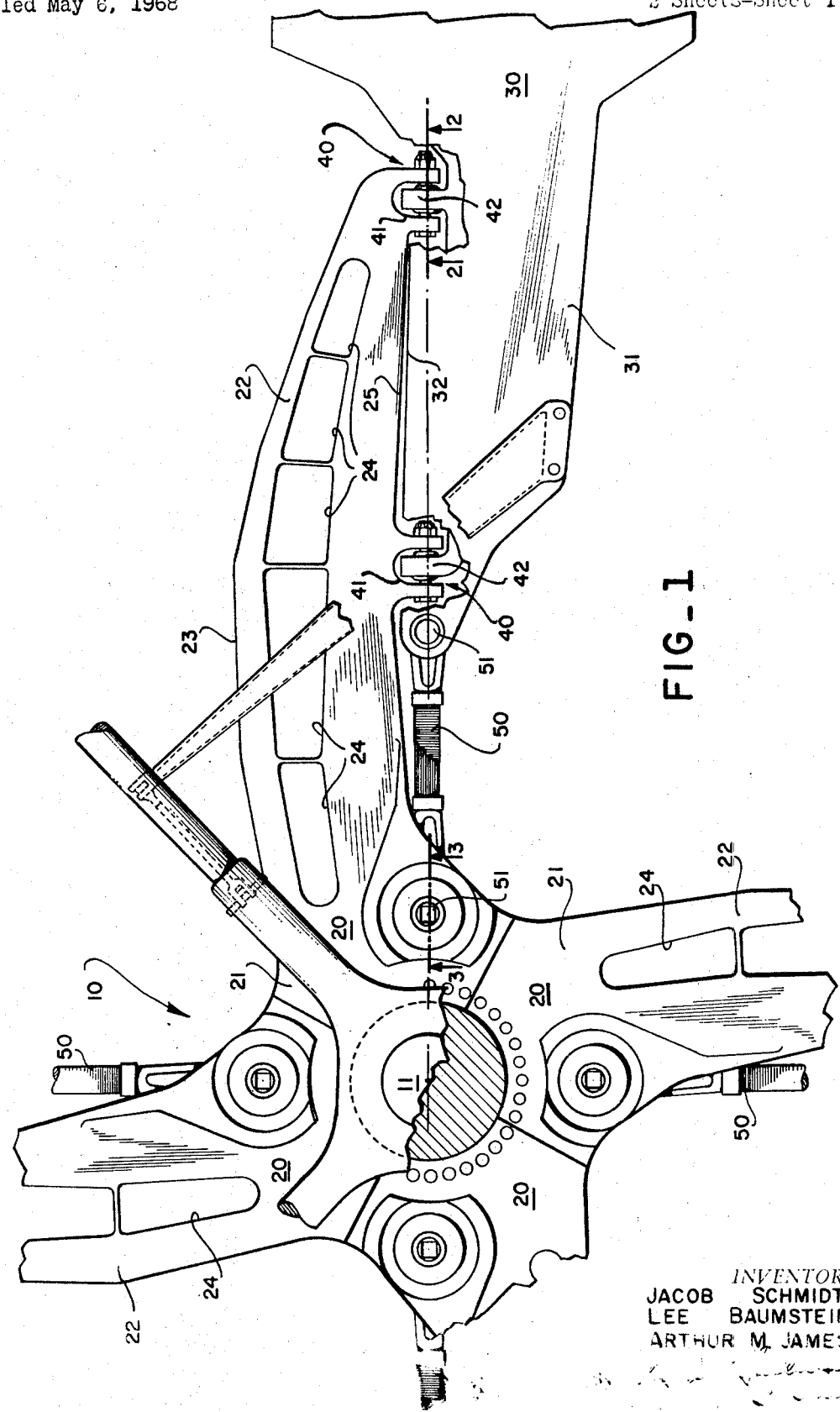

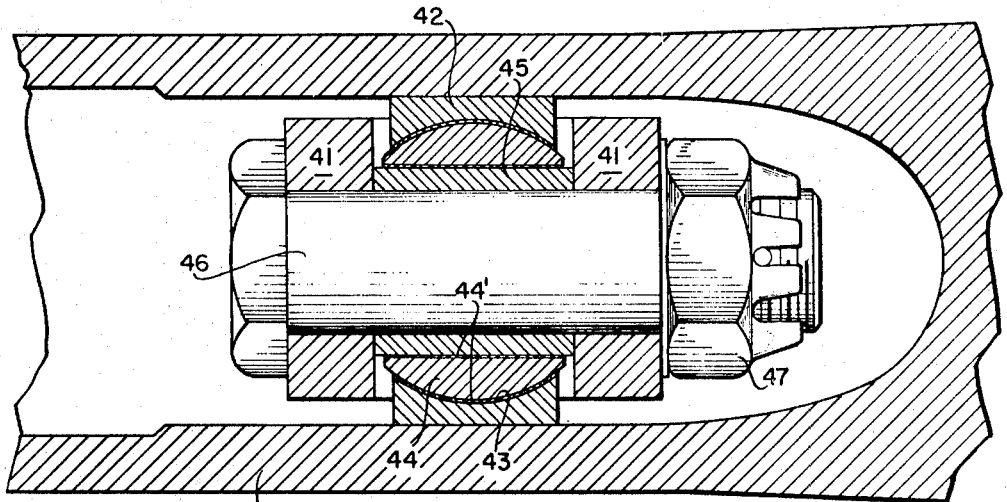
FIG_2
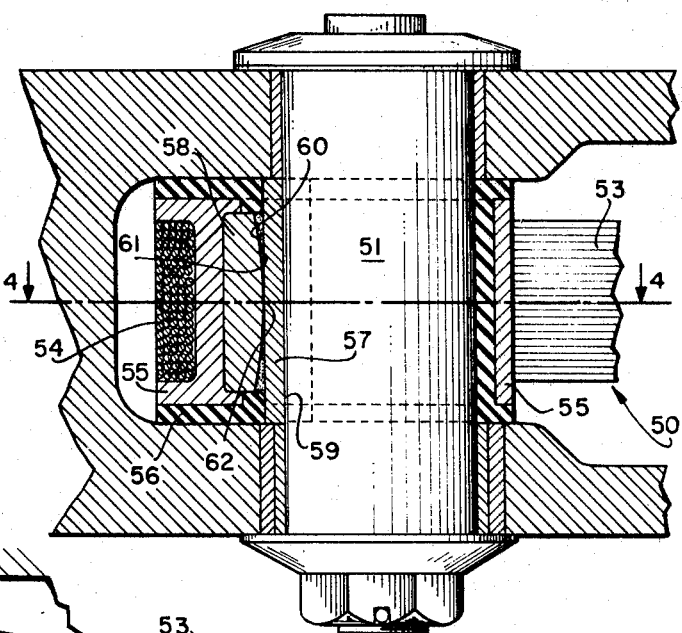
FIG_3
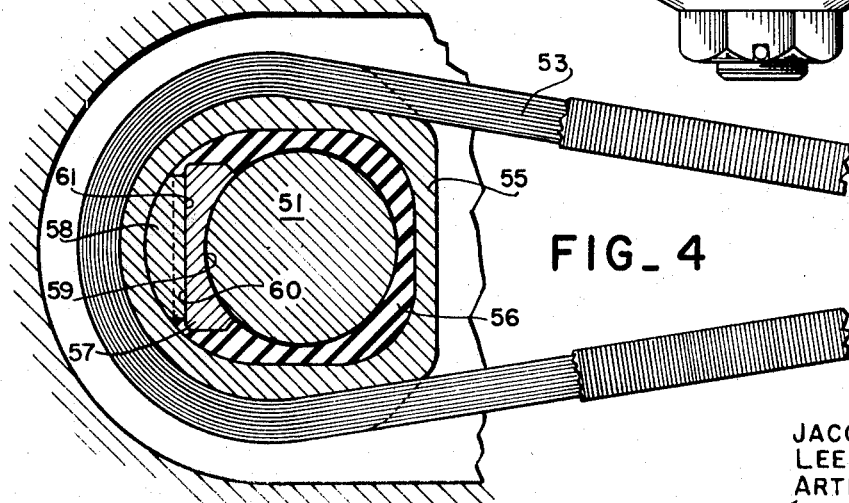
FIG_4
INVENTORS
JACOB SCHMIDT
LEE BAUMSTEIN
ARTHUR M. JAMES
By
Agents United States Patent Office 3,518,025
Patented June 30, 1970

ABSTRACT OF THE DISCLOSURE

A helicopter rotor system comprising a central hub having a plurality of radially extending arms, each arm extending alongside a lengthwise portion of a blade and being connected thereto by bearing means located on the blade feathering axis. A tension-torsion member is attached directly to the hub and the rotor blade to efficiently transfer the centrifugal load of the blade to the hub and prevent longitudinal separation therebetween.

BACKGROUND OF THE INVENTION AND DESCRIPTION OF THE PRIOR ART

This invention relates to helicopter rotor system and particularly to blade feathering means for reducing the aerodynamic drag of the rotor system.

A structural arrangement presently in use to accomplish blade feathering in a helicopter rotor system includes a hub having radially extending cylindrical arms with a sleeve located on each arm. A rotor blade is attached to each sleeve with each blade feathering about the concentric axes of the cylindrical arm and sleeve. Bearing means are mounted between each cylindrical arm and sleeve combination to transfer the in-plane or flapping loads, a laminated strip tension-torsion member is located within each cylindrical arm to connect one end of the cylindrical arm to one end of the sleeve to transfer the centrifugal loads from the blade to the hub.

However, such an arrangement creates a large aerodynamic drag because of the relatively large cylindrical profile. Also, these cylinders are very rigid, and during any vertical deflection of the rotor blade all of the bending occurs on a very short mounting member which holds these cylinders. This arrangement is also excessively heavy and costly to manufacture.

Another helicopter rotor system, as exemplified in U.S. Pat. No. 3,280,918, consists of a central hub portion having a plurality of radially extending plate-like arms with a rotor blade having a blade mounting extension disposed in a chordwise side-by-side relationship to each corresponding hub arm. Bearings are located between the adjacent sides of the blade mounting extension and the arm to connect the extension thereto. A tension-torsion member or means is utilized for connection between each blade and the hub for transferring the centrifugal loads therethrough. However, this member is connected to the hub and blade by tubular extensions which are integrally connected to the bearings. This necessitates making the bearings of a size large enough to withstand the centrifugal loads transferred through them from the tension-torsion member. Even with these large bearings, scoring and binding of these bearings are evidenced because of these high loads. The size of this bearing arrangement also results in a large profile and aerodynamic drag on the rotor. Furthermore, the conventional tension-torsion member, also shown in U.S. Pat. No. 3,280,918, generally consists of laminated strips secured at its ends to the blade and hub by bolts. Such a member is cumbersome and inefficient due to its inherent torsional stiffness and the large frictional areas involved.

Also, any vertical deflection of the member creates an unequal load distribution on the member at its bolted ends, thus causing fatigue and cracking of the strained end portions of the member.

SUMMARY OF THE INVENTION

A helicopter rotor system of this invention comprises a central hub having a plurality of radially extending arms and a rotor blade movable about a feathering axis having a blade mounting extension disposed in a side-by-side relationship to each corresponding hub arm. The blade extension is connected to the hub arm by bearing means located on the blade feathering axis between the adjacent sides of the blade mounting extension and the hub arm. A tension-torsion member is attached directly to the hub and the rotor blade to transfer the centrifugal load generated in the rotor blade to the hub, while the in-plane and flapping loads are transferred by the bearing means.

An object of this invention is to provide a helicopter rotor system having a reduced profile to reduce the aerodynamic drag on the system.

Another object of this invention is to provide a helicopter rotor system having blade connecting bearing means which act independently of the tension-torsion member, thereby reducing the size of the bearing means and preventing any binding or scoring thereof.

Another object of this invention is to provide an improved tension-torsion member having self-aligning means for permitting an equal load distribution to the member during vertical deflection.

Another object of this invention is to provide an improved tension-torsion member having a low inherent stiffness and small friction producing areas.

Various other objects and advantages will appear from the following description of the several embodiments of the invention.

BRIEF DESCRIPTION OF THE DRAWINGS

FIG. 1 is a plan view of a helicopter rotor in accordance with the invention, partially cut away for clarity of illustration;

FIG. 2 is a partial sectional view of the feathering hinge bearings taken generally along section line 2—2 in FIG. 1;

FIG. 3 is a partial sectional view of the tension-torsion member taken generally along section line 3—3 in FIG. 1; and FIG. 4 is a sectional view of the tension-torsion member taken along section line 4—4 in FIG. 3.

DETAILED DESCRIPTION OF THE PREFERRED EMBODIMENT

In the embodiment of the invention illustrated in FIGS. 1–4, the helicopter rotor, indicated generally at 10, broadly includes a rotor mast 11, a plurality of hub sections 20 (of which one is shown in its entirety) attached to the mast 11, a rotor blade 30 pivotally connected to each hub section 20 through a bearing 40, and a tension-torsion member or means 50 directly attached to each blade-hub combination.

More specifically, each hub section 20 includes a central portion 21 fixedly mounted on the rotor mast 11, and an arm 22 extending radially outward therefrom. The radial arm 22 of each hub section 20 is of a relatively thin plate-like design to reduce the aerodynamic drag created by the rotor system. The leading edge 23 of each arm 22 is formed of a smooth rounded surface to minimize the creation of drag by the hub sections 20. A plurality of cavities 24 are also defined in each arm 22 near the leading edge thereof for weight saving purposes while the structural integrity of the arm is still maintained. Located on the trailing edge 25 of each arm 22 is a pair of identical bifurcated lugs 41 integrally formed and spacedly mounted thereon.

Each rotor blade 30 includes an elongated inner end portion 31 which extends radially inward in a side-by-side relationship with the trailing edge 25 of the corresponding arm 22. A pair of lugs 42 is located on the leading edge 32 of the end portion 31. Each of the lugs 42 extends within the corresponding bifurcated lug 41 for cooperative arrangement and connection thereto. As can be seen, the blade 30 pivots or feathers about an axis that extends through the bearings 40 which axis is normal to the center of rotation of the mast 11.

As shown in FIG. 2, each of the lugs 42 is provided with an aperture, the wall thereof defining a concave spherical bearing race 43 for receiving a spherical bearing 44. A hollow cylindrical journaling sleeve 45 is fixedly connected to the sides of the bifurcated lugs 41. Bolt means 46 extends through each of the bifurcated lugs 41 and through the interior of the sleeve 45 and is secured thereto by a nut 47. The spherical bearing 44 is free to rotate about the sleeve 45 and relative to bearing race 43. A liner 44' of self lubricating material is provided between the bearing surfaces. Because of the relatively smaller bearing surface and the resulting frictional differential, under normal operation the spherical bearing 44 rotates about the sleeve 45 when the blade 30 rotates with respect to the hub arm 22, thereby obviating relative movement between it and the bearing race 43. However, should there be galling or an increased frictional resistance between the bearing 44 and the bearing sleeve 45, the bearing 44 then rotates with respect to bearing race 43, thereby providing a fail-safe bearing device. Also, the bearing 44 does not extend the entire width between the bifurcated lugs 41, hence there is a certain amount of play between the bearing 44 and the bearing sleeve 45 to allow for any mis-alignment between the lug 42 and the bifurcated lugs 41.

As shown in FIG. 1, a tension-torsion member 50 is attached to each hub section 20 and rotor blade 30 by bolts 51. The inboard end of the member 50 extends into a cavity formed in the central hub portion 21 while the outboard end extends into a bifurcated joint formed at the inner end portion 31 of the blade 30. The length of the tension-torsion member 50 is oriented along the blade feather axis inboard of the bearing means 40.

FIGS. 3 and 4 show one end of the tension-torsion member 50 located in the cavity of the central hub portion 21. The other end of the member 50 located in the blade cavity is similar in structure. The tension-torsion member 50 includes a plurality of wires forming an elongated strand 53 with one end 54 extending around a hollow and irregularly shaped sleeve 55. The strand 53 is inherently rigid in a tensile sense. Its purpose is to prevent longitudinal separation of the hub 20 and the blade 30 while transferring those centrifugal forces to the hub 20 which are generated in the blade 30. However, the strand 53 is also inherently soft in torsion, i.e., it has the ability to twist very easily, thereby providing for freedom of rotation during blade actions.

Inside each sleeve 55 is a rubber encasement 56 having a cylindrical opening through which the bolt 51 extends. Partially encapsulated in each rubber encasement 56 are two bearing members 57 and 58. Bearing member 57 has a cylindrical bearing surface 59 frictionally engaging the bolt 51, and an opposite planar surface 60. The bearing member 58 has a curved surface 61 facing the planar bearing surface 60 in a rocking relationship, an opposite side of the bearing member 58 being curved and engaging the internal surface of the sleeve 55. The curved bearing surface 61 frictionally engages the bearing surface 60 in a straight line contact, as shown at 62. Therefore, as mentioned above, upon any vertical deflection of the hub, the strand 53 rocks as a unit, tension on the individual wires being evenly distributed throughout the constituting means 50.

Without this rocker action, any oscillatory vertical deflection of the tension-torsion member would normally cause uneven distribution of the load on the wires forming strand 53, with most of the stress being on the top and bottom portions of the strand. However, because of the curved surface 61 of the bearing member 58, any oscillatory vertical deflection of member 50 rocks the bearing member 58 causing the straight line point of contact 62 between the bearing members 57 and 58 to vertically oscillate. In this manner the tension-torsion member remains longitudinally rigid with the load still being evenly distributed over the whole strand 53.

In operation, during rotation of the rotor system, each of the blades 30 feathers about its respective feathering axis with the in-plane and flapping loads of each blade 30 being transferred to the hub 20 through the bearings 40. As stated previously, the tension-torsion member 50 transfers the centrifugal forces, generated in each blade 30 to the hub 20, while preventing the creation of a high torsional blade loading which would be detrimental to the feathering operation of the blade. The tension-torsion member 50 is attached directly to the hub portion 20 and to the rotor blade 30 so as to prevent interference with the bearing means 40. This relieves the need for large bearings, provides for use of smaller bearings and has the ultimate benefit of facilitating the application of a narrow profile, thus reducing aerodynamic drag and saving considerable weight. Since the beamwise thickness of each rotor hub and blade combination is substantially thinner than their chordwise thickness, the aerodynamic drag on the entire arrangement is also substantially reduced. The stiffness of the rotor hub portion can also be tuned to any desired value by predetermining the beamwise-chordwise thickness ratio for the optimum weight-deflection parameters.

It will be understood that various changes in the details, materials, steps and arrangements of parts, which have been herein described and illustrated in order to explain the nature of the invention, may be made.

We claim:

1. In a rotor system construction for a helicopter, including a rotor mast, a rotor hub and radial arm thereon, and a rotor blade having an inner end portion in trailing relationship and pivotally connected to said radial arm, the improvement comprising, at least a pair of bifurcated lugs spacedly mounted on the trailing edge of said radial arm, a pair of lugs on the leading edge of said inner end portion, each of said lugs cooperatively arranged with respective to one of said bifurcated lugs by extending within said one of said bifurcated lugs, and self-aligning bearing means disposed in each of said lugs, said bearing means comprising, (a) a spherical bearing member disposed between races in each of said lugs, (b) bolt means extending through said bearing member and being secured to said bifurcated lugs, and (c) a sleeve mounted on said bolt means between said bifurcated lugs, whereby said rotor blade is pivotable about said radial arm.

2. The improvement of claim 1 wherein the axis of said bearing means is coincident with the feathering axis for said rotor blade.

3. The improvement of claim 2 in which a liner of self-lubricating material is provided between said sleeve and bolt means.

4. The improvement of claim 1 in which a liner of self-lubricating material is provided between said sleeve and bolt means.

(References on following page)

References Cited

UNITED STATES PATENTS

| | | |
|---|---|---|
| 2,137,952 | 11/1938 | Rothenhoefer. |
| 2,995,192 | 8/1961 | Scheutzow. |
| 3,330,362 | 7/1967 | Kastan _____ 170—160.53 |
| 3,415,324 | 12/1968 | Austin. |
| 3,434,372 | 3/1969 | Delker. |
| 3,434,546 | 3/1969 | Rodriguez et al. __ 170—160.58 |

FOREIGN PATENTS 622 of 1915 Great Britain.

EVERETTE A. POWELL, Jr., Primary Examiner